United States Patent

Eysmondt et al.

[11] Patent Number: 5,853,457
[45] Date of Patent: Dec. 29, 1998

[54] FILTER MATERIAL AND PROCESS FOR REMOVING OZONE FROM GASES AND LIQUIDS

[75] Inventors: Jörg Eysmondt, Hofheim; Frank Osan, Kelkheim; Andreas Schleicher, Beselich, all of Germany

[73] Assignee: Ticona GmbH, Frankfurt, Germany

[21] Appl. No.: 793,215

[22] PCT Filed: Aug. 2, 1995

[86] PCT No.: PCT/EP95/03081

§ 371 Date: May 5, 1997

§ 102(e) Date: May 5, 1997

[87] PCT Pub. No.: WO96/04988

PCT Pub. Date: Feb. 22, 1996

[30] Foreign Application Priority Data

Aug. 17, 1994 [DE] Germany .......................... 44 29 165.5

[51] Int. Cl.⁶ .................................................. B01D 53/66
[52] U.S. Cl. ................... 95/138; 96/108; 96/111; 210/660; 210/767; 210/807; 210/266; 210/96.1
[58] Field of Search .................... 95/138; 96/108, 96/111; 210/660, 681, 692, 767, 799, 807, 739, 661, 96.1, 266, 263

[56] References Cited

U.S. PATENT DOCUMENTS

| 4,259,299 | 3/1981 | Hagiwara et al. ................ 423/210 |
| 4,604,270 | 8/1986 | Tom ..................................... 423/262 |
| 5,324,429 | 6/1994 | Holland ............................. 210/484 |
| 5,423,902 | 6/1995 | Strutz et al. ........................ 95/273 |
| 5,498,677 | 3/1996 | Weller et al. ..................... 526/133 |
| 5,527,457 | 6/1996 | Holland ............................. 210/170 |
| 5,662,801 | 9/1997 | Holland ............................. 210/924 |

FOREIGN PATENT DOCUMENTS

| 1161824 | 9/1958 | France . |
| 49087334 | 8/1974 | Japan . |
| 1214493 | 12/1970 | United Kingdom . |
| 1532227 | 11/1978 | United Kingdom . |

Primary Examiner—Peter A. Hruskoci

[57] ABSTRACT

The invention relates to a filter material and to a process for removing ozone from gases and liquids, in which a gas stream or a liquid is brought into contact with a filter material made of an unsaturated cycloolefin polymer or cycloolefin copolymer. The filter material can be used with all ozone-containing gas streams and liquids. Thus, for example, it is used in the removal of the ozone used in sterilization or formed by a copier machine, in addition for removing and detoxifying ozone in liquids.

17 Claims, 1 Drawing Sheet

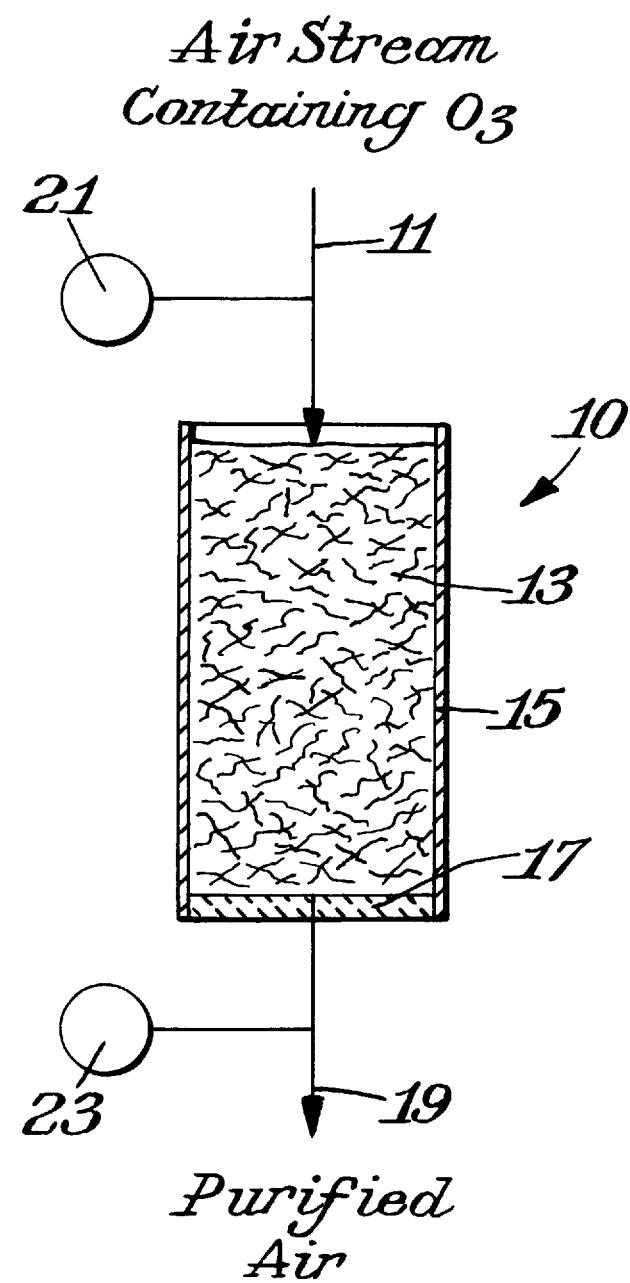

FILTER MATERIAL AND PROCESS FOR REMOVING OZONE FROM GASES AND LIQUIDS

The invention relates to a filter material and to a process for removing ozone from gases and liquids, in which a gas stream or a liquid is brought into contact with a filter material made of unsaturated cycloolefin homopolymers or copolymers.

DESCRIPTION OF THE PRIOR ART

It is known that small amounts of ozone are formed during electrophotographic copying and printing processes. The ozone formed is permanently given off into the surrounding air by the appliances used, for example photocopiers or laser printers. Ozone is a nuisance not only owing to its odor, but it is harmful to health even at low concentrations. To remedy this situation, a multiplicity of processes have been developed which describe the removal of ozone from the air stream released from such apparatuses. In these processes, the ozone is either destroyed or chemically or physically bound.

Destruction of the ozone by heating or by interaction with a metal catalyst is disclosed (cf. JP 60/197 223 and JP 60/19 115). However, disadvantages of the thermal destruction of ozone are the energy requirement and the high temperature, both of which are necessary for complete ozone destruction.

It is further disclosed to pass the gas stream through a filter in which the ozone is catalytically decomposed (cf. JP 58/081 425). The base material of the filter is impregnated with one or more metal compounds, metals or alloys, for example iron compounds, manganese compounds or nickel compounds, to which is further added a compound or a metal selected from the group consisting of the noble metals, for example palladium or platinum. These catalysts are highly expensive and generally have only a restricted service life, since such heterogeneous catalysts are rapidly deactivated by various catalyst poisons.

A filter comprising a support material made of aluminum oxide or activated carbon which is impregnated with ethylenically unsaturated compounds which react with the ozone is also disclosed (cf. DE 37 28 802). It is a disadvantage that the compounds, for example terpenes, depending on the support material, are volatile in many cases, that is can be discharged in small amounts and thus are lost. Furthermore, only a small portion of the filter weight is available as active constituent.

In addition, a filter for ozone decomposition is disclosed which consists of a fiber plate whose fibers contain an ozone-decomposing catalyst (cf. JP 03/270 718). These fibers, which in a preferred embodiment are porous, consist of a polymer having one of the following functional groups which react vigorously with ozone, e.g. —SH, =S, —NH$_2$, =NH, —CN and —OH. Ozone-decomposing catalysts mentioned are metals, such as gold, silver, copper, palladium, iron, nickel, cobalt and manganese, or their oxides, and also alumina and kiesel-guhr. The fiber required for producing the filter is obtained by a conventional spinning process, the catalyst being dispersed in the spinning solution and being uniformly distributed in the fiber after spinning. By adding a second polymer which, together with the first polymer, causes a phase separation, and various post-treatments of the spinning product, a porous phase is obtained which contains the catalyst particles. The resulting fibers are then made into the filter by conventional methods. Apart from the fact that the polymers considered to be suitable are only mentioned en bloc—only polyacrylonitrile is disclosed—preparation of the filters is laborious and highly complex.

SUMMARY OF THE INVENTION

The object of the invention was therefore to provide a filter and a process for ozone removal in which said disadvantages do not occur.

The invention relates to a filter material for removing ozone from gases and liquids, in which the filter material comprises an unsaturated cycloolefin homopolymer or cycloolefin copolymer.

The invention also relates to a process for removing ozones from gases, in which a filter material which comprises an unsaturated cycloolefin homopolymer or cycloolefin copolymer having repeating units based on the compounds of the formulae (I), (II) or (III) is used, the gas or the liquid being brought into contact with the surface of the filter material.

BRIEF DESCRIPTION OF THE DRAWING

The sole Figure of the Drawing is a schematic representation of a filtering system of this invention.

DETAILED DESCRIPTION

The filter material for removing ozone from gases and liquids preferably comprises an unsaturated cycloolefin polymer or cycloolefin copolymer having repeating units based on compounds of the formulae (I), (II) or (III)

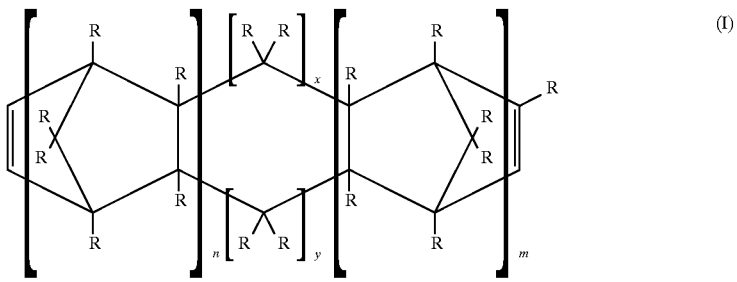

(I)

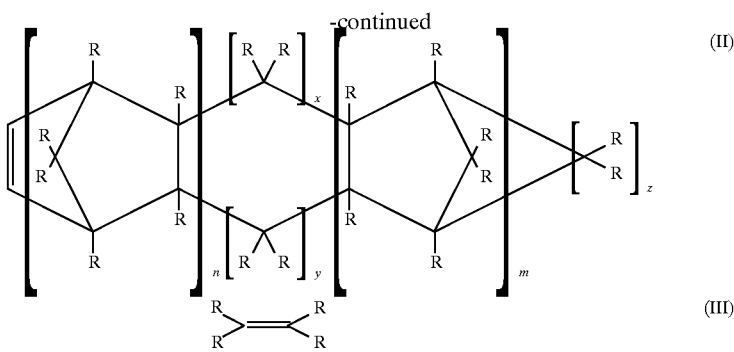

in which the radicals R independently of one another are hydrogen atoms, halogen atoms, $C_1$–$C_{20}$-alkyl groups, $C_2$–$C_{20}$-alkenyl groups or $C_6$–$C_{20}$-aryl groups and n, m, x, y and z are identical or different and are 0, 1, 2, 3, 4 or 5.

If no diolefin of the formula I is used, at least one of the monomers of the formulae II to III is substituted with an unsaturated (olefinic) radical, where this radical, together with the base structure or itself, can form one or more rings. Two radicals R can form rings which can be saturated or unsaturated. Two radicals R located on the same carbon atom can be a double bond (=CR'R''), which is itself substituted by radicals R (e.g. ethylidenenorbornene).

As cycloolefin, preference is given to norbornene and its higher homologs (e.g. tetracyclododecene), and its derivatives. These may be synthesized by the Diels-Alder reaction. Particular preference is given to norbornene and tetracyclododecene.

As diolefins, particular preference is given to norbornadiene, dicyclopentadiene, 5-ethylidene-2-norbornene and 5-isopropenyl-2-norbornene.

Preferred acyclic olefins are ethylene and propylene.
Preferred comonomer combinations are listed in Table 1:

| Variant | Cyclic diolefins | Cycloolefins | Acyclic diolefins | Acyclic olefins |
|---|---|---|---|---|
| 1 (preferred) | x | | | |
| 2 (preferred) | x | | | x |
| 3 (preferred) | x | x | | |
| 4 (preferred) | x | x | | x |
| 5 | | x | x | |
| 6 | | x | x | x |
| Preferred monomers | norbornadiene 5-vinyl-norbornene 5-ethylidene norbornene 5-isopropenylnorbornene dicyclopentadiene 3-, 4-, 5-vinylcyclohexane | norbornene 5-methyl-norbornene tetracyclododecene cyclopentene | 1,4- and 1,5-hexadiene butadiene | ethylene propylene butene styrene |

The polymer consists of 0.1 to 100% by weight, based on the total amount of monomers (preferably 20 to 95% by weight, particularly preferably 50 to 90% by weight, especially preferably 70 to 85% by weight), at least of one monomer of the formulae I and II, cyclic diolefins being preferred, and 0 to 99.9% by weight of a monomer of the formula III.

The unsaturated cycloolefin copolymers are prepared by polymerization of cyclic or acyclic diolefins, where acyclic diolefins must be copolymerized with cyclooles, fins, and cyclic diolefins can be copolymerized with cycloolefins. In both variants, furthermore, copolymerization can be performed with acyclic olefins. A glass transition temperature above room temperature is of importance, preferably above 70° C., particularly preferably above 100° C.

For the polymerization, transition metals can be used as catalyst. Titanium catalysts and palladium catalysts are particularly suitable.

Polymerization Example 1

A clean and dry 1.5 dm³ polymerization reactor equipped with agitator was flushed with nitrogen and then charged with a solution of 258 g of norbornadiene in 300 cm³ of toluene. The reactor was then brought, with stirring, to a temperature of 90° C. 20 cm³ of methylaluminoxane solution in toluene (10% by weight methylaluminoxane having a molar mass of 1300 g/mol according to cryoscopic determination) were then metered into the reactor and the mixture was stirred for 15 min at 90° C. In parallel thereto, 5.2 mg of isopropylidene(cyclopentadienyl) (1-indenyl) zirconium dichloride were dissolved in 20 cm³ of methylaluminoxane solution in toluene and preactivated by allowing to stand for 15 minutes. The solution of the complex was then metered into the reactor. The mixture was then polymerized at 90° C. for 2 hours with stirring (750 rpm). The reactor contents were then rapidly discharged into a stirred vessel which had been charged with 5 cm³ of isopropanol. This mixture was admixed with 2 dm³ of acetone, stirred for 10 min and then the suspended solids were filtered off. The polymer filtered off was then added to 300 cm³ of a mixture of two parts of 1-normal hydrochloric acid and one part of ethanol and this suspension was stirred for 2 hours. The polymer was then filtered again, washed with water and dried for 15 hours at 60° C. and 0.2 bar. 2.9 g of product were obtained. The polymeric product did not have a softening temperature below the decomposition temperature (approximately 200° C.) either by DSC measurement or by microscopic study. The iodine value was 159 g of iodine/100 g.

Polymerization Example 2

Example 1 was repeated, but the metallocene used was 5.5 mg of 4-cyclopentadienyl-4,7,7-trimethyltetrahydroindenylzirconium dichloride. 4.6 g of polymer were obtained. The polymeric product did not have a softening temperature below the decomposition temperature (approximately 200° C.) either by DSC measurement or by microscopic study. The iodine value was 203 g of iodine/100 g.

To produce a filter, the polymers can be used as powders, fibers, films or other shaped bodies. By suitable processes, filters even having particularly high surface area may be produced, for example having a lattice or honeycomb structure. The powders to be used have commercially conventional particle sizes, with granules also being usable. It is important in this case that the gas or the liquid to be treated can be passed through the powder, for example in the form of a fixed bed, without interference. If the polymers are used as fibers, these are used as staple fibers, needle felt, non-woven material, carded sliver or woven fabric. Films or shredded films can be used in a suitable form.

The ozone-containing gas stream or the liquid can be treated with the filter material according to the invention at any temperature which is below the softening point of the polymers. Generally, the temperature is in the range from −10° to +80° C., preferably 0° to 50° C.

The ozone is generally removed quantitatively, the reaction times being dependent on the flow velocity of the medium to be treated and the surface area of the filter material and/or the bed height in the case of powders. Generally, the residence time in the filter is 0.1 second to 10 minutes, preferably 0.5 second to 1 minute. The limit values can also be exceeded, however. No volatile products are formed in the removal of the ozone from the gas stream or liquid stream.

The filter material based on unsaturated cycloolefin homopolymers or cycloolefin copolymers can generally be used as unblended material. However, the addition of conventional fillers, such as chalk, talc, clay, mica, and/or fibrous reinforcing agents, such as glass fibers and carbon fibers, whiskers, and other conventional additives and processing aids, for example sliding agents, release agents, antioxidants, UV stabilizers, is also possible.

The filter of the invention can be used with all ozone-containing gas streams and liquids. Thus, it is used, for example, in the removal of the ozone used in sterilization or formed by a copier machine, and in addition for removing and detoxifying ozone in liquids.

Turning now to the Drawing, the preferred embodiment of filtering system 10 comprises means 11 for creating an airflow, i.e. for bringing an air stream containing a minor amount of ozone (e.g. 0.2 to 0.66 mg of ozone per cubic meter of air stream) into contact with a filter material 13 housed in, for example, a tube 15. The filter material 13 can be particulate, e.g. in the form of powder or granules. The tube 15 is provided with a purified air exit means 17 comprising a layer of glass frit which permits purified air 19 to pass out of the filtering system 10 while retaining the particulate filtering material 13 in place as a fixed bed. Suitable measuring instruments 21 and 23 track the content of ozone in the entering air stream and the purified air 19.

EXAMPLES

The ozone required as starting material in the Examples was prepared by a conventional ozone generator which was fed with pure oxygen.

The ozone concentration was determined with an APOA 350E measuring instrument based on a UV photometer from Horiba (Industriestr. 9, D-61449 Steinbach). The ozone/oxygen mixture was then diluted with air or argon to the concentrations mentioned. Since it is known that ozone slowly decomposes in water and in moist gases, the gases used for the dilution were dried. After the dilution, the gas stream was divided. One portion was passed through an empty tube, another through a corresponding vertical tube filled with the filter material. In order to be able to hold the polymer, the glass tube was closed at the lower end with a porous glass plate (frit). The flow velocities were controlled in such a manner that equal volumes flowed through both tubes per unit time.

Various amounts of the polymer according to Polymerization Example 1 were packed into a glass tube having a diameter of approximately 25 mm which was closed at the lower end with a glass frit. The ozone-containing gas stream was passed through this powder bed. The flow velocities and the ozone concentration were set successively. Measurements were made over the respective period given in the Table.

TABLE 2

| Volumetric flow rate [1/h] | Time (h) | Sample weight [g] | Ozone concentration (mg/m$^3$) | Ozone concentration downstream of the filter (mg/m$^3$) |
| --- | --- | --- | --- | --- |
| 50 | 2 | 0.9 | 0.2 | —[1)] |
| 110 | 24 | 1.2 | 0.66 | — |
| 110* | 24* | 1.2* | 0.50* | — |

[1)]not detectable

We claim:

1. A filtering system comprising:
   means for bringing a fluid stream containing ozone into contact with a filter material,
   a filter material for reducing the content of ozone in said fluid stream containing ozone, said filter material comprising polymerized unsaturated cycloolefin, and means for recovering a purified fluid stream from said filtering system.

2. The filtering system as claimed in claim 1, wherein the polymerized cycloolefin is a cycloolefin homopolymer or cycloolefin copolymer or combination thereof and has a mean molecular mass, Mw, of 2,000 to 2,000,000.

3. The filtering system as claimed in claim 1, wherein the purified fluid which is recovered is essentially free of ozone.

4. The filtering system as claimed in claim 1, wherein the means for bringing a fluid stream containing ozone into contact with the filter material is a means for bringing a gas stream into said contact.

5. The filtering system as claimed in claim 4, wherein the gas stream is an air stream.

6. The filtering system as claimed in claim 1, wherein said system further comprises at least one measuring instrument for measuring the content of ozone in the fluid stream.

7. The filtering system as claimed in claim 1, wherein said filtering material is in the form of a powder particles, fibers, films, or a shaped body or bodies.

8. The filtering system as claimed in claim 1, wherein the system is constructed and arranged to provide a contact time, between the fluid stream and the filtering material, lasting 0.1 second to 10 minutes.

9. A process for reducing the content of ozone in an ozone-containing fluid, which comprises: bringing the ozone-containing fluid into contact with a polymerized unsaturated cycloolefin and removing an amount of ozone from said ozone-containing fluid.

10. The process as claimed in claim 9, wherein the ozone-containing fluid is a gas.

11. The process as claimed in claim 10, wherein the ozone-containing fluid is air.

12. The process as claimed in claim 9, wherein said polymerized unsaturated cycloolefin is a cycloolefin homopolymer or cycloolefin copolymer or combination thereof, and said polymerized unsaturated cycloolefin is the filtering material of a filtering system.

13. The process as claimed in claim 12, wherein said filtering material is in the form of powder particles, fibers, films, or a shaped body or shaped bodies.

14. The process as claimed in claim 9, wherein the temperature at which contact occurs between the ozone-containing fluid and the polymerized unsaturated cycloolefin is in the range of −10° to +80° C.

15. The process as claimed in claim 9, wherein the contact time, between the ozone-containing fluid and the polymerized unsaturated cycloolefin is in the range of 0.1 second to 10 minutes.

16. The process as claimed in claim 9, wherein said removing step removes essentially all the ozone from the ozone-containing fluid.

17. An air filtration system comprising:

means for bringing an ozone-containing air stream into contact with a filter material, a container for holding filter material and for permitting said air stream to pass through said container without interference, said container having an exit for the purified air stream, and within said container, a filter material for reducing the content of ozone in said air stream, said filter material consisting essentially of a polymerized unsaturated cycloolefin.

* * * * *